United States Patent [19]

Chu

[11] Patent Number: 5,279,747
[45] Date of Patent: Jan. 18, 1994

[54] DECONTAMINATION EXTRACTION PROCESS FOR TREATMENT OF OILY SOLIDS

[75] Inventor: Humbert H. Chu, Houston, Tex.

[73] Assignee: Shell Oil Company, Houston, Tex.

[21] Appl. No.: 946,683

[22] Filed: Sep. 18, 1992

[51] Int. Cl.⁵ .............................................. B01D 11/02
[52] U.S. Cl. ............................................ 210/751; 210/770
[58] Field of Search .............. 210/633, 751, 768, 770, 210/634, 696, 698, 713; 208/13, 332; 209/1, 2, 10

[56] References Cited

U.S. PATENT DOCUMENTS

| | | |
|---|---|---|
| 3,950,230 | 4/1976 | Greenfield et al. |
| 4,686,048 | 8/1987 | Atherton et al. |
| 4,741,840 | 5/1988 | Atherton et al. |
| 4,863,607 | 9/1989 | Andrew et al. |
| 4,906,302 | 3/1990 | Bruya |
| 4,975,198 | 12/1990 | Steiner |
| 5,049,256 | 9/1991 | Luce ................................ 210/633 |

Primary Examiner—Frank Sever

[57] ABSTRACT

A process for the removal of hydrocarbons from contaminated oily solids performed under atmospheric conditions by utilizing a single processing zone wherein multiple processing steps are carried out to remove contaminants. The steps include loading contaminated oily solids into a zone where the solids are reduced in size, dewatering or deoiling the oily solids, drying the resulting solids to remove moisture and volatile organics, extracting the resulting dried solid with organic solvent and further drying the extracted resulting dried solid to remove residual moisture, volatile organics and residual solvent, and fixing the metals.

11 Claims, 1 Drawing Sheet

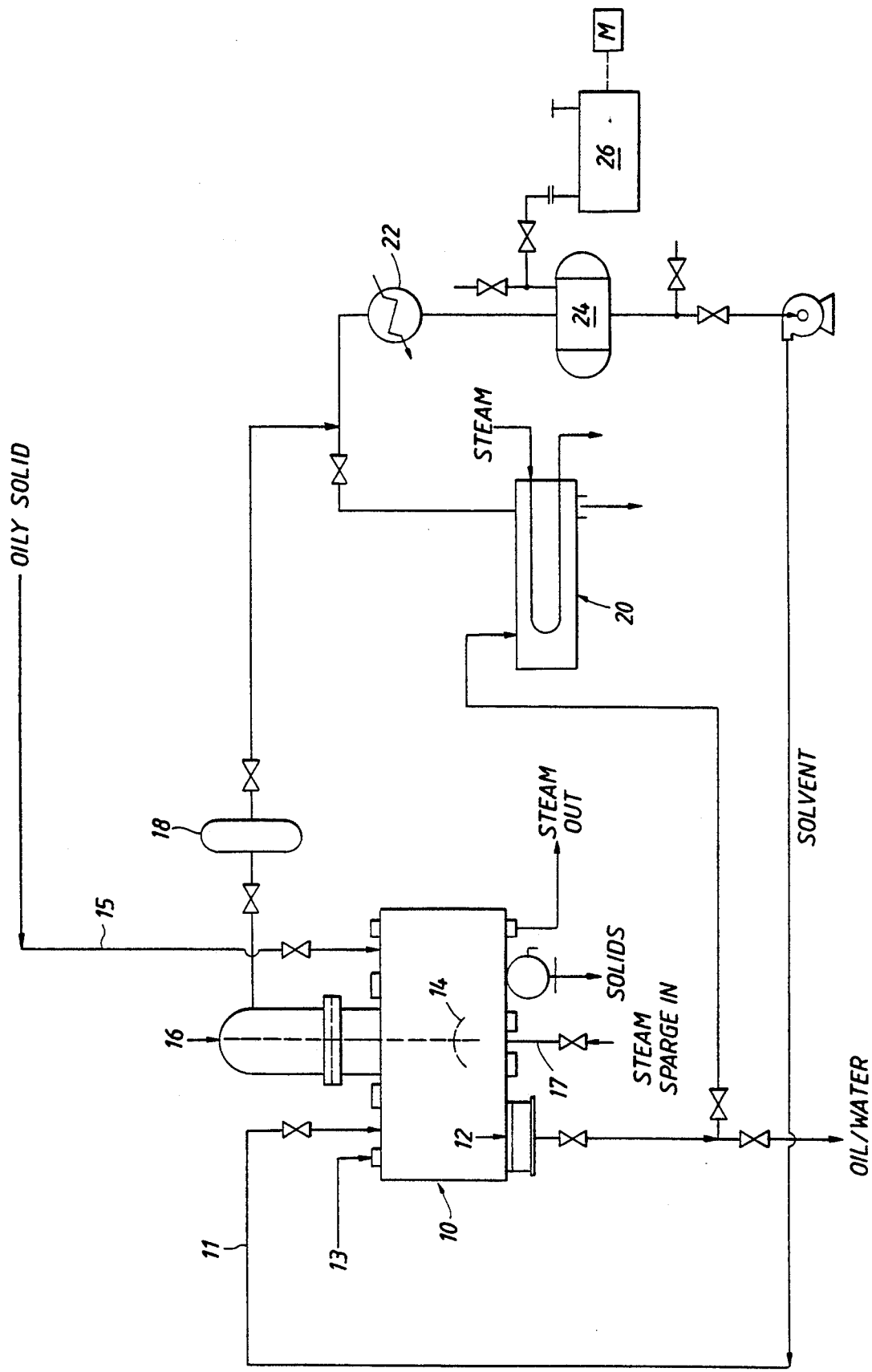

DECONTAMINATION EXTRACTION PROCESS FOR TREATMENT OF OILY SOLIDS

BACKGROUND OF THE INVENTION

Field of the Invention

The present invention pertains to a process of decontaminating hydrocarbon-contaminated oily solids such as oily sludge or oil-contaminated soil by a combination of solvent extraction, filtration and thermal-drying in a single processing zone.

Description of the Related Art

There are three available means of treating oily solid wastes in the environment, i.e., incineration, cement kiln disposal and solvent extraction. Incineration costs for refinery hazardous wastes have increased rapidly which makes it a less attractive alternative. Presently there are no commercial solvent extraction processes that can completely treat refinery K-wastes to meet the standards necessary for environmental restrictions. Cement kiln disposal is currently the most sought after alternative for hazardous waste disposal. However, since the new EPA Boiler and Industrial Furnaces (BIF) rule which aimed at regulating hazardous waste disposal at cement kilns was published, there are increasing uncertainties about the future of cement kilns for hazardous waste disposal.

The solvent extraction processes that nearly meet the standards set by the EPA have their limitations.

U.S. Pat. No. 4,863,607 discloses a process for the removal of refinery waste by feeding refinery waste into an extractor and mixing with triethylamine at 40° F. At 40° F., water and oil are soluble in the amine, thereby forming a single liquid phase. The solid/liquid slurry is pumped to a centrifuge which separates the solids from the liquid. The solids are then sent back to the extractor where they contact a regenerated solvent. After the last of several extraction stages, the solids that are separated at the centrifuge are sent to a rotary dryer to reduce the residual amine content. The liquid fraction from the centrifuge is heated to 130°-140° F. where two distinct phases are formed: amine/oil and water. These two phases are separated by decantation and then fed to the solvent evaporator and water stripper respectively for recovery of amine which is sent back to the extractor. This process relies on the use of a single solvent, and is relatively complicated due to its, use of refrigeration and centrifuge units.

The Critical Fluid Systems(CFS) Propane Extraction Process uses high pressure liquefied propane solvent countercurrently contacting an oily waste that is fed into a first-stage extractor. Hydrocarbons are extracted to the solvent phase by agitation and mixing. After the first extraction stage, the water/solids phase is separated from the solvent/hydrocarbon phase in a first-stage decanter, and sent to the second-stage extractor/decanter. The water/solid phases from the second-stage extractor/decanter are sent to a tank. The solvent/hydrocarbon phase from the first decanter is sent to a solvent still where propane is recovered from the top as vapor which is then compressed and recycled to the second-stage extractor for reuse. More stages can be added if necessary. Hydroclones are used to remove solids from the solvent extract. The CFS's high pressure propane extraction process has a high cost per ton when processing the oily solids due to its high pressure and vapor compression requirement and the oily solid feed has to be pumpable.

Neither one of the processes described above can treat a wide range of refinery oily wastes with the use of a single solvent and both processes separate the liquid phase from the solid phase by settling, centrifuging or decantation, which is labor intensive and time consuming. Also neither process is capable of operating at ambient temperature and atmospheric pressure.

The present invention provides a simple solvent extraction process for decontaminating oily solid containing organic waste utilizing a single processing zone wherein filtration is a major step in the multiple processing steps of the invention, and the process is carried out at ambient temperature and atmospheric pressure. The present invention can be applied to a very broad list of contaminants and leaves basically only a trace of waste residue.

SUMMARY OF THE INVENTION

The present invention proposes a process scheme where oily solid wastes are dewatered and treated with solvent in a single filtration/mixing/extraction/drying zone to minimize waste handling and its associated hazardous exposure. All filtration of the process is carried out in a single filtration device located in the single zone.

As applied to refinery listed wastes, such as API separator bottoms, DAF float or slop oil emulsion solids, this invention provides a simple and effective process to meet most of the Best Demonstrated Available Technology (BDAT) standards. These standards set limits on the materials that may be present in the oily solid waste, such as volatile and semi volatile organics, cyanides, and metals. The process of the invention comprises:

a) reducing the particle size of solids in the oily solid waste in the zone;
b) dewatering or deoiling the oily solid waste by filtration aided by agitation and heating to break emulsion;
c) drying and agitating the resulting solid from the zone to remove moisture and volatile organics;
d) extracting at least once under atmospheric pressure the resulting dried solid with an organic solvent boiling below about 150° C. to reduce the hydrocarbon contaminant level; and
e) separating the solvent containing the extracted contaminants from the extracted resulting dried solid by filtration and agitation;
f) further drying the extracted resulting dried solid to remove residual moisture, residual solvents and volatile organics; and
g) fixing metals by adding a stabilizing agent.

DESCRIPTION OF THE DRAWING

The Figure is a process flow diagram representing the oily solid decontamination process of the invention.

DETAILED DESCRIPTION OF THE INVENTION

The present invention provides a solvent extraction process which can be used to treat contaminated oily solid waste that contains a mixture of water, oil, and solids. The process removes water and oil and other contaminants, thus leaving solid residues which are suitable for disposal in a landfill.

The type of unit which is suitably used for decontaminating hydrocarbon-contaminated oily solids in the process of the invention is a single filter/dryer/mixer/extractor that is equipped to mix, extract, filter and dry the oily solid waste. For example, the multiple step processing zone is suitably in the configuration of a steam-jacketed rotary drum, equipped with internal baffles for chopping and mixing, and suitable inlet means for introducing the solvent and the contaminated solid, as well as separate liquid and solid outlets with the liquid outlet located below the filtration device to facilitate solvent separation from its solvent-washed solid. A suitable multipurpose processing zone can be obtained by modification of a commercially available multipurpose processing zone such as the one used to extract caffeine from coffee beans that is manufactured by Littleford Brothers, Inc., Florence, Ky.

An illustrative suitable single processing zone will include a plow/chopper or equivalent device and a liquids-solid filter system, all designed to handle the particle size and compressibility of a solid and/or filter cake being processed.

The filter device is mounted within the mixer in such a manner so as not to interfere with the efficient mix action of the plow/chopper or equivalent device. The efficiency of the filter is such that only a relatively small filter area is required compared to conventional filtration processes. The internal mounting capability of the filter device allows the consecutive processing steps of mixing, reacting, filtering, washing, and drying to be carried out in a single processing zone instead of the several processing vessels disclosed in the prior art.

The preferred device for breaking and agitating the refinery oily solid into smaller particles in the present invention is a plow/chopper device. A plow/chopper device can be of various contours depending on the size of the zone used. There are other devices, such as rotaries, that are effective for the reduction in size of solid particles. The particle size is important but not critical to the extraction step of the process. Typically, particle sizes are less than $\frac{1}{2}$" outside diameter, preferably from about $\frac{1}{8}$" to about $\frac{1}{4}$" outside diameter.

The oily solid waste is dewatered or deoiled by vacuum filtration or pressurized nitrogen filtration and agitation under atmospheric pressure. Indirect steam heating may be engaged to break emulsions, and filter aids such as diatoinaceous earth could be added if necessary to facilitate the filtration. Removed oil and/or water mixture can be sent to a refinery oil/water separator, to an API separator unit or a refinery biotreater.

After filtration the solid waste is subjected to a thermal drying step to remove additional moisture that could serve as an extraction barrier for an organic solvent. The temperature range to remove moisture is about 100° C. to about 110° C. Higher temperature drying in this step could optionally be used to remove at least a portion of volatile organic contaminants. Suitable temperature ranges for this latter modification are from about 100° C. to about 200° C.

The resulting dried solid is then extracted with an organic solvent. The solvents used in this process must meet three requirements: (1) favorable solubility for the hydrocarbon contaminants under atmospheric conditions; (2) suitable boiling point for ready separation from the solid in the drying step as well as separation from the oil in the solvent regeneration step; and (3) acceptability from health, safety, and environmental standpoints. Preferably, the solvent is a hydrocarbon or chlorohydrocarbon solvent boiling between about 40° C. and about 150° C.

Solvents such as toluene (b.p. 110° C.) or xylene (b.p. 141° C.) are more effective for extracting heavy or multiple-ring hydrocarbon compounds. Hexane (b.p. 69° C.) is quite suitable because of its low boiling point and it is less of i an environmental concern. However, extraction by methylene chloride (b.p. 40° C.) is also suitable because, being a more polar solvent, it is likely to be less affected by the moisture content of the solid. Different solvents can be used interchangeably to cover a wide range of contaminants.

Suitable ratios of solvent to dried solid in the extraction phase of the present invention can be in the range of from about 1/1 to about 8/1, but the preferred ratio of solvent to oily solid waste is from about 2/1 to about 4/1 by weight solvent to oily solid per extraction stage. The number of extraction steps in the present invention is typically between 2 to 6 stages, depending on the oily solid waste, the solvent used and the extent of decontamination required.

In a preferred embodiment, the solvent and oily solid waste are agitated together under atmospheric pressure and at ambient temperature from about 10 minutes to about one hour. Preferably, the solvent and oily solid waste are agitated together for approximately one hour to afford a mixture of solvent-washed solid and spent solvent containing extracted organic contaminants. After each extraction, the solvent/solid mixture is filtered and agitated under atmospheric pressure to separate spent solvent from extracted resulting dried solid and, depending on the contaminant level in the washed solid, the solid is then subjected to one or more subsequent extraction steps prior to the second drying step of the process. Following each solvent extraction step, the spent solvent containing the extracted oil is sent to a solvent evaporator, which is operated above the boiling point of the solvent to separate the solvent from the oil. The solvent vapor leaving the evaporator will be condensed in a condenser and recycled for subsequent extractions.

The second drying step of the process, preferably conducted by indirect steam heating and with agitation, removes the residual moisture in the extracted resulting dried solid, preferably to below 5% wt., and the residual solvent down to from about less than 1% wt. to practically nil. An even higher drying temperature is useful as a part of the second drying step to remove residual organics. The suitable time for this portion of the second drying step in the present invention is from about 10 minutes to approximately 2 hours at a temperature of at least 10° C. above the boiling point of the solvent used in the extraction step for the present invention. If necessary, stabilizing agents such as cement or coal ash can be added to the dried solids to fix metals.

Finally, the treated, dry solid is unloaded from the unit and disposed of, for example, in a class 1 landfill, if BDAT standards are met, or to an on-site backfill, if more stringent hazardous delisting requirements are met. The unit is also equipped with a live steam injection option to control the moisture content (for instance, to prevent dusting) in the solids before unloading, if necessary.

DETAILED DESCRIPTION OF THE DRAWING

The zone used in the present invention can best be described by referring to the figure. The filter/dryer/mixer/extractor zone 10 of the preferred embodiment is equipped with a filter screen 12 for solid-liquid separation, an effective plow/chopper mixing device 14 for mixing the solvent and oily solid waste and a steam-jacketed main chamber 13 for drying to remove residual solvent and hydrocarbons from residual solids.

The oily solid waste is first loaded into the plow/chopper mixing device 14 of the filter/dryer/mixer/extractor zone 10 for plow/chopping of oily solid waste to reduce the solid into smaller particle sizes. The chopped oily solid waste is then dewatered and deoiled through a filter screen 12. Once the oily solid waste is deoiled and dewatered, the resulting solid is then contacted with solvent for extraction purposes. After the solvent and solid have been mixed by the mixer 14, the spent solvent is then filtered from the extracted solid waste through a filter screen 12 located in the filter/dryer/mixer/extractor zone 10. In case of vacuum filtration, the vacuum is maintained by a vacuum pump 26.

Following each solvent extraction step, the spent solvent containing the extracted oil is sent to a solvent evaporator 20, which is operated above the boiling point of the solvent to separate the solvent from the oil. The solvent vapor leaving the evaporator 20 will be condensed in the condenser 22 and sent to the decanter 24 and recycled for subsequent extractions.

Water or solvent vapor generated during the drying step is sent through the vacuum stack 16 and a filter 18 located at the top of the filter/dryer/mixer/extractor zone 10, to remove entrained solids. The solvent is recovered by condensation in a condenser 22 and sent to the decanter 24 for reuse.

ILLUSTRATIVE EMBODIMENT 1

Table 1 presents laboratory test data supporting this invention.

In the laboratory tests, hexane and toluene were used to treat API separator bottoms or oily solid wastes. The experiments were conducted under ambient temperature and atmospheric pressure in a laboratory-scale mixer/extractor. The process of the invention using either hexane or toluene met all the BDAT standards for both volatile or semi-volatile organics in less than three extraction stages, except for toluene, cyanides and leachable nickel. The high toluene content in the solid residue for the hexane extraction tests is attributed to the inefficiency of hexane in extracting aromatic compounds. The high toluene content in the solid residue for the toluene extraction tests is attributed to the inefficient final drying step for the removal of residual solvent in the lab tests. In the process of the invention, the residual toluene can be removed by volatilization/agitation in the extractor either before or after the solvent extraction cycles. The results of these experiments are shown in Table 1.

TABLE 1

Hexane and Toluene Extraction Tests[a] of Refinery A API Separator Bottoms Hazardous Wastes

| | | Refinery A API Separator Bottoms | | | | Final Rule |
|---|---|---|---|---|---|---|
| | | Hexane | | Toluene | | |
| Constituent | Feed | First Ex. | Third Ex. | First Ex. | Third Ex. | BDAT Standard |
| BDAT Volatiles, mg/kg (dry) | | | | | | |
| Benzene | 0.97 | <0.625 | <0.625 | <0.625 | <0.625 | 14 |
| Toluene | 22 | 97[b] | 190[b] | 95[b] | 1200[b] | 14 |
| Ethylbenzene | 12 | <0.625 | <0.625 | <0.625 | 1.5 | 14 |
| Xylene | 140 | <0.625 | <0.625 | <0.625 | 1.0 | 22 |
| BDAT Semi-Volatiles, mg/kg (dry) | | | | | | |
| Phenol | <3.6 | <3.6 | <3.6 | <3.6 | <3.6 | 3.6 |
| O-Cresol | <5 | <5 | <5 | <5 | <5 | 6.2 |
| P-Cresol | <5 | <5 | <5 | <5 | <5 | 6.2 |
| Naphthalene | 140 | 2 | 2 | 3 | 2 | 42 |
| Phenanthrene | 230 | 41 | 15 | 48 | 13 | 34 |
| Anthracene | <20 | 2 | 2 | 4 | 2 | 28 |
| Di-n-butyl phthalate | <3.6 | <3.6 | <3.6 | <3.6 | <3.6 | 3.6 |
| Bis(2-ethylhexyl) phthalate | 9 | <5 | <5 | <5 | <5 | 7.3 |
| Pyrene | 31 | 6 | <20 | 6 | <20 | 36 |
| Benzo(A) anthracene | 16 | <20 | <20 | 1 | <20 | 20 |
| Chrysene | 24 | <10 | <10 | 3 | <10 | 15 |
| Benzo(A) pyrene | <10 | <10 | <10 | <10 | <10 | 12 |
| BDAT Total Cyanide, mg/kg (dry) | 4.0 | 4.6 | 5.7 | 4.9 | 4.5 | 1.8 |
| BDAT TCLP Metals, mg/l | | | | | | |
| Total Cr | 0.0045 | NA[c] | <0.004 | NA | <0.004 | 1.7 |
| Nickel | 1.7 | NA | 1.79 | NA | 0.57 | 0.2 |

[a]Test Conditions:
Solvent/dewatered-sludge ratio: 4/1 by weight
Extraction time: 1 hour
Oven-drying extraction residue: 12 hours, $N_2$ purged
[b]Reasons for High Toluene Content:
1) Hexane extraction - hexane is not effective for toluene removal.
2) Toluene extraction - final drying in the lab test was not efficient for residual toluene solvent removal.
[c]Not Analyzed
NOTE: UNDERSCORED NUMBERS EXCEED BDAT STANDARDS.

ILLUSTRATIVE EMBODIMENT 2

Table 2 shows data where the third stage toluene extraction residue was dried overnight in a nitrogen-purged oven operated at one of two temperatures, 150° C. or 220° C. The toluene content in the extraction residue was reduced from 1200 ppmw to 13 ppmw by a moderate increase of oven temperature from 150° C. to 220° C. The latter meets the BDAT standards for toluene.

TABLE 2

Effect of Oven-Drying Temperature on Residual Solvent Removal (Refinery A API Separator Bottoms)

| | Oven-drying Temperature, °C. | |
|---|---|---|
| | 150 | 220 |
| Toluene content in 3rd extraction residue after oven-drying, mg/kg | 1200 | 13 |

What is claimed is:

1. A process comprising: decontaminating at ambient temperatures and pressures, a hydrocarbon-containing oily solid waste in a single processing zone comprising:
   a. reducing the particle size of the solids in the oily solid waste in the zone;
   b. dewatering or deoiling the oily solid waste in the zone by filtration aided by agitation and heating to break emulsion;
   c. drying and agitating the resulting solid in the zone, thereby removing moisture and a portion of the volatile organics, directly thereafter;
   d. extracting at least once the resulting dried solid under atmospheric pressure and ambient temperature with an organic solvent selected from the group consisting of hexane, toluene and xylene;
   e. separating the solvent containing the extracted hydrocarbons from the extracted resulting, substantially anhydrous dried solid by filtration and agitation;
   f. further drying the extracted resulting dried solid to remove residual moisture, residual volatile organics and residual solvent; and
   g. fixing metals by adding a stabilizing agent.

2. A process according to claim 1, wherein the oily solid waste has a particle size of less than ¼" outside diameter.

3. A process according to claim 1, wherein the filtration is by vacuum.

4. A process according to claim 1, wherein the filtration is by pressurized nitrogen.

5. A process according to claim 1, wherein the stabilizing agent is cement.

6. A process according to claim 1, wherein the stabilizing agent is coal ash.

7. A process according to claim 1, wherein the organic solvent is hexane.

8. A process according to claim 1, wherein the organic solvent is toluene.

9. A process according to claim 1, wherein the organic solvent is xylene.

10. A process according to claim 1, wherein the organic solvent is methylene chloride.

11. A process comprising: decontaminating at ambient temperatures and pressures, a hydrocarbon-containing oily solid waste in a single processing zone comprising:
   a. reducing the particle size of the solids in the oily solid waste in the zone to a particle size having an outside diameter of less than ¼";
   b. dewatering or deoiling the oily solid waste in the zone by filtration aided by agitation and heating to break emulsion;
   c. drying and agitating the resulting solid in the zone, thereby removing moisture and a portion of the volatile organics, directly thereafter;
   d. extracting at least once the resulting dried solid under atmospheric pressure and ambient temperature with hexane;
   e. separating the hexane containing the extracted contaminants from the extracted resulting, substantially anhydrous dried solid by filtration and agitation;
   f. further drying the extracted resulting dried solid to remove residual moisture, residual volatile organics and residual hexane; and
   g. fixing metals by adding a stabilizing agent selected from cement and coal ash.

* * * * *